Figure 1:
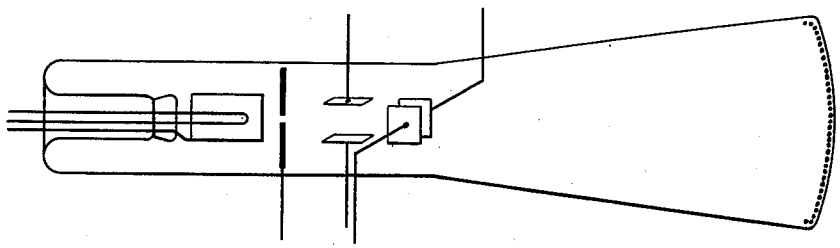
Figure 2:
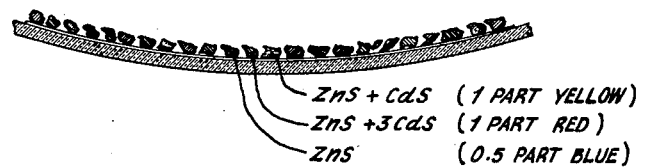

Jan. 22, 1935.  F. MICHELSSEN  1,988,605
LUMINESCENT SCREEN
Filed Aug. 19, 1932

ZnS + CdS  (1 PART YELLOW)
ZnS + 3CdS (1 PART RED)
ZnS       (0.5 PART BLUE)

INVENTOR
FRITZ MICHELSSEN
BY
ATTORNEY

Patented Jan. 22, 1935

1,988,605

UNITED STATES PATENT OFFICE 1,988,605

LUMINESCENT SCREEN

Fritz Michelssen, Berlin, Germany, assignor to Telefunken Gesellschaft für Drahtlose Telegraphie m. b. H., Berlin, Germany, a corporation of Germany Application August 19, 1932, Serial No. 629,561
In Germany August 20, 1931

4 Claims. (Cl. 250—27.5)

The present invention relates to luminescent screens and particularly to such screens capable of being used in a cathode ray or X-ray tube.

Recent research has shown that properly prepared or manufactured zinc sulfide when in purified state results in a relatively powerful light-blue luminescence, and that by the incorporation of cadmium prior to crystallization conditions may be secured so that, subsequent to crystallization, substances are obtained which according to the amount of cadmium addition will be caused to luminesce in widely varying colors, say, green or red. It has therefore been suggested to utilize zinc-cadmium sulfides or extremely pure zinc sulfide for the inertialess conversion of electrical energy or Roentgen-rays into light, for the purpose of insuring a high efficiency. However, such inertialess operation of the substances is predicated upon the absence of all extraneous metals even in most minute traces. Indeed, extremely clean working, as far as the completion of the crystallizing process is concerned, is required if a substance free from after-glow is to be obtained. For even traces of impurities, e. g., 1/20% of copper will occasion rather strong afterglow in zinc sulfide or in zinc-cadmium sulfides.

For a number of purposes, for instance, Braun tubes, television work, Roentgen pictures, it is, however, desirable to have available a substance that will be as free as feasible from inertia action, and which will give off white light.

Various ways and means are disclosed in the present invention to the end of making screens of the kind as stated of any desired color or shade, including those giving off white light, and this is accomplished by the suitable admixture or commingling of substances free from after-glow effects and of different colors. The starting material consists of sufficiently fine-grained, completely crystallized substances. For example, if zinc sulfide insuring inertialess operation, being of extremely high purity and giving a bluish luminescence is mixed with zinc-cadmium sulfide of yellow luminescence in the right proportions, a green-luminescent screen can be manufactured. A mixture of zinc sulfide giving off a light blue luminescence and of zinc-cadmium sulfide producing a red fluorescence results in a vivid purple or violet color, according to the proportions chosen. However, inside the scope of this invention it is also possible to mix the pure zinc or zinc-cadmium sulfide crystals of different composition, e. g., zinc silicate, cadmium tungstate or calcium tungstate in order to thus obtain the desired shade of color.

For some purposes it is also permissible to obtain feeble after-glow in the mixture provided it lasts an adequately brief period only. In the practice of manufacturing television screens, for instance, an after-glow lasting for example $\frac{1}{70}$ of 1 second may be admissible without an incidental impairment in picture quality. If the substances inherently luminescing in widely varying colors are commingled with zinc or zinc-cadmium sulfide then, according to the invention, it is possible to insure white luminescence of the screen and this secures a more favorable effect than plain uni-colored pictures, for instance, when viewing television or Roentgen-ray pictures.

Having now described my invention what I claim and desire to secure by Letters Patent is the following:

1. A composition of matter in which has been incorporated zinc-sulfide having high fluorescent properties when excited by cathode rays and a salt of zinc and cadmium which is capable of changing the color of the resultant fluorescent effect.

2. A composition of matter in which has been incorporated zinc-sulfide having high fluorescent properties when excited by cathode rays and a sulfide which includes at least cadmium.

3. A composition of matter in which has been incorporated zinc-sulfide having high fluorescent properties when excited by cathode rays and a zinc-cadmium sulfide.

4. A composition of matter for use as a cathode ray tube screen in which has been incorporated a zinc salt and a sulfide which includes zinc and cadmium.

FRITZ MICHELSSEN.